(12) United States Patent  
Cheng

(10) Patent No.: US 6,517,247 B2
(45) Date of Patent: Feb. 11, 2003

(54) POSITIONING STRUCTURE OF BEARING AND AXLE TUBE

(75) Inventor: Jui-Hung Cheng, Kaoshiung (TW)

(73) Assignee: Yen Sun Technology Corp., Kaohsiung Hsien (TW)

( * ) Notice: Subject to any disclaimer, the term of this patent is extended or adjusted under 35 U.S.C. 154(b) by 7 days.

(21) Appl. No.: 09/824,676

(22) Filed: Apr. 4, 2001

(65) Prior Publication Data

US 2002/0146182 A1 Oct. 10, 2002

(51) Int. Cl.[7] ............................................... F16C 33/10
(52) U.S. Cl. ........................................ 384/279; 384/120
(58) Field of Search .............................. 384/114, 115, 384/118, 119, 120, 279

(56) References Cited

U.S. PATENT DOCUMENTS

| | | | | |
|---|---|---|---|---|
| 1,816,758 A | * | 7/1931 | Adams | 384/279 |
| 2,035,519 A | * | 3/1936 | Apple | 384/279 |
| 2,855,249 A | * | 10/1958 | Gerard | 384/279 |
| 3,407,013 A | * | 10/1968 | Weichsel | 384/114 |
| 5,281,035 A | * | 1/1994 | Lo | 384/279 |
| 5,441,386 A | * | 8/1995 | Hsieh | 384/279 |
| 5,822,846 A | * | 10/1998 | Moritan et al. | 384/120 |
| 6,336,745 B1 | * | 1/2002 | Horng et al. | 384/107 |

* cited by examiner

Primary Examiner—Thomas R. Hannon
(74) Attorney, Agent, or Firm—Birch, Stewart, Kolasch & Birch, LLP

(57) ABSTRACT

A positioning structure of a bearing and an axle tube, wherein, the positioning hole of the axle tube has a periphery formed with an oil storage space corresponding to the bearing, so that when the bearing is received and positioned in the positioning hole of the axle tube, the friction force between the bearing and the inner wall of the positioning hole can be reduced efficiently. Thus, the shaft hole of the bearing is not easily deformed due to squeeze, thereby preventing the center from deflecting. At the same time, the oil storage space is relatively increased, thereby enhancing the lubricating effect of the bearing. The oil storage space is directly integrally formed in the periphery of the positioning hole during fabrication of the shaft tube. Thus, the fabrication is rapid, thereby decreasing the cost of fabrication.

3 Claims, 5 Drawing Sheets

US 6,517,247 B2

POSITIONING STRUCTURE OF BEARING AND AXLE TUBE

BACKGROUND OF THE INVENTION

1. Field of the Invention

The present invention relates to a positioning structure of a bearing and an axle tube, and more particularly to a positioning structure of a bearing and an axle tube, which can prevent the center of the bearing from deflecting efficiently, enhance the lubricating effect, and can save the cost of fabrication.

2. Description of the Related Art

In general, when a conventional bearing is mounted in an axle tube, the inner wall of the bearing is formed with an oil storage groove or oil channel, for achieving the better oil storage and oil guide effects. A conventional positioning structure of a bearing and an axle tube in accordance with the prior art is shown in FIG. 1, wherein the inner wall of the bearing 1 is formed with an oil storage groove 10 for providing a lubricating effect during rotation of the rotation shaft 12. By formation of the oil storage groove 10, the excessive lubricating oil released from the bearing 1 may be stored in the oil storage groove 10 temporarily without being leaked outward, thereby increasing the lifetime of the bearing 1. At the same time, the friction area between the bearing 1 and the rotation shaft 12 is reduced, thereby decreasing the friction force therebetween, so that rotation of the rotation shaft 12 is more convenient. However, the conventional positioning structure of the bearing 1 and the axle tube 14 has the following disadvantages:

1. The center of the bearing is easily deflected:
   The conventional bearing 1 is directly pressed into the positioning hole 140 of the axle tube 14 in a tight fit manner. Thus, the periphery of the bearing 1 is deformed by the frictional squeeze of the inner wall of the positioning hole 140 of the axle tube 14, so that the center of the shaft hole 16 of the bearing 1 is easily deflected. Thus, the rotation of the rotation shaft 12 in the shaft hole 16 is inconvenient, thereby easily producing noise.

2. The cost of fabrication is high:
   The conventional bearing 1 is directly formed with the oil storage groove 10 in the inner wall of the shaft hole 16. Therefor, the bearing 1 cannot be integrally formed with the oil storage groove 10 during the molding process of the bearing 1, and the oil storage groove 10 needs to be formed by a working process additionally, thereby causing inconvenience in fabrication and thereby increasing the cost of fabrication.

SUMMARY OF THE INVENTION

The primary objective of the present invention is to provide a positioning structure of a bearing and an axle tube, which can prevent the center of the bearing from deflecting efficiently, can enhance the lubricating effect, and can save the cost of fabrication.

Accordingly, the main feature of the present invention is in that the positioning hole of the axle tube has a periphery formed with an oil storage space corresponding to the bearing, so that when the bearing is received and positioned in the positioning hole of the axle tube, the friction force between the bearing and the inner wall of the positioning hole can be reduced efficiently. Thus, the shaft hole of the bearing is not easily deformed due to squeeze, thereby preventing the center from deflecting. At the same time, the oil storage space is relatively increased, thereby enhancing the lubricating effect of the bearing. The oil storage space is directly integrally formed in the periphery of the positioning hole during fabrication of the shaft tube. Thus, the fabrication is rapid, thereby decreasing the cost of fabrication.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
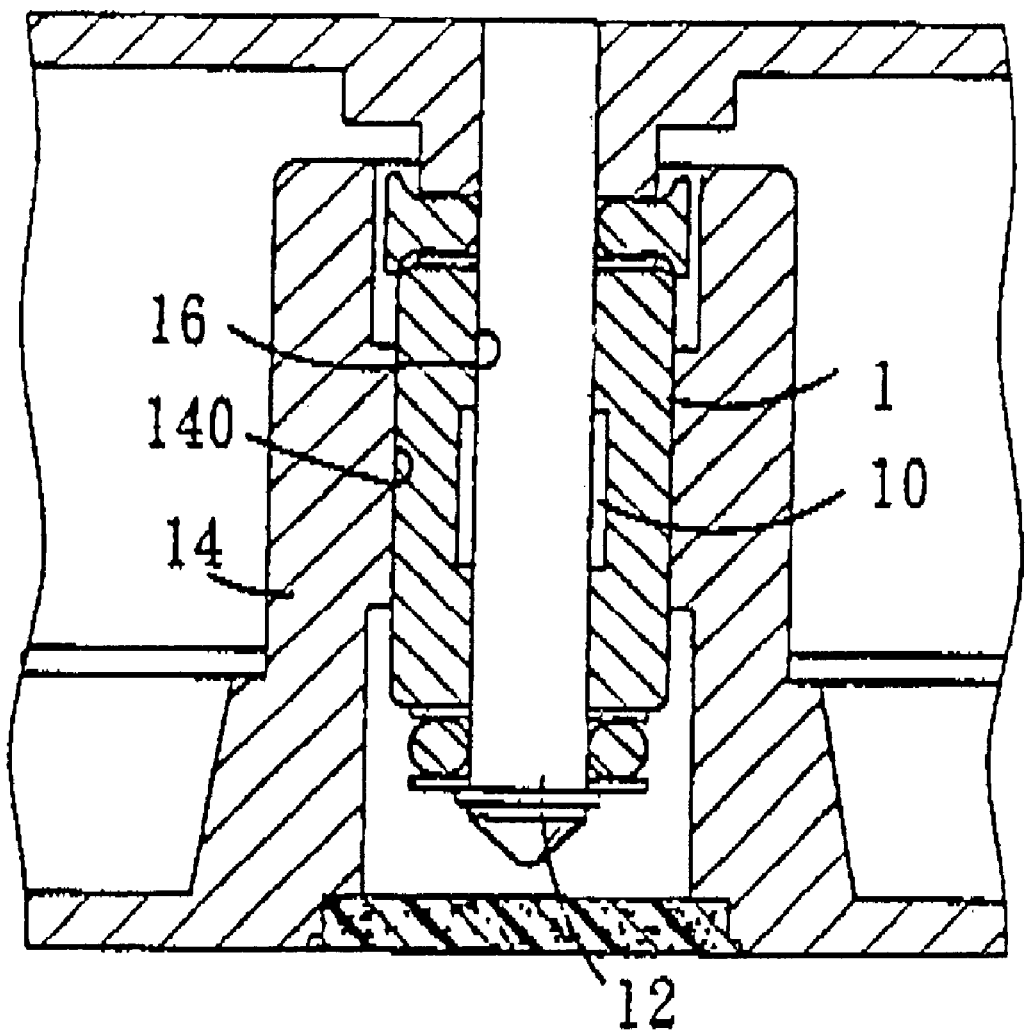
FIG. 1 is an assembled cross-sectional schematic view of a conventional positioning structure of a bearing and an axle tube in accordance with the prior art.
Figure 2:
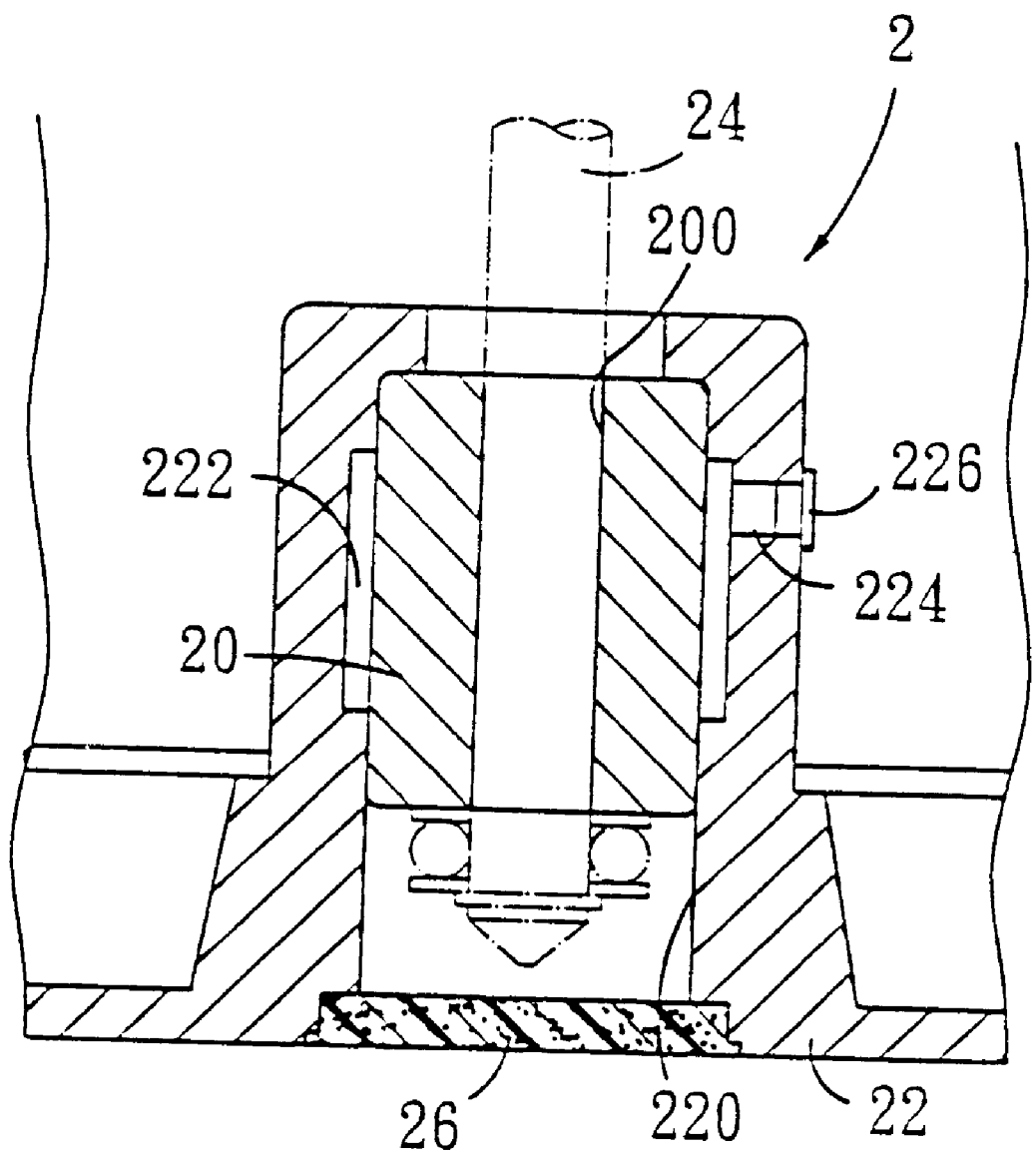
FIG. 2 is an assembled cross-sectional schematic view of a positioning structure of a bearing and an axle tube in accordance with a first embodiment of the present invention.

Referring to the drawings and initially to FIG. 2, a positioning structure 2 of a bearing and an axle tube in accordance with a first embodiment of the present invention comprises a bearing 20 and an axle tube 22. The axle tube 22 has a positioning hole 220 for receiving and positioning at least one bearing 20 which has a shaft hole 200 for passage of a rotation shaft 24 (as shown in phantom lines in the figure). An oil seal cover 26 is sealed on the bottom of the positioning hole 220. Especially, the positioning hole 220 has a periphery formed with an oil storage space 222 corresponding to the bearing 20. In addition, the positioning hole 220 has a side edge formed with an oil filling hole 224 which is sealed by a removable plug 226.

Still referring to FIG. 2, during assembly of the present embodiment, the bearing 20 is received and positioned in the positioning hole 220 of the axle tube 22 in a tight fit manner. The inner wall of the positioning hole 220 of the axle tube 22 is formed with the oil storage space 222, so that when the bearing 20 is assembled and positioned, the friction area and friction force between the periphery of the bearing 20 and the inner wall of the positioning hole 220 of the axle tube 22 can be reduced efficiently. Thus, the shaft hole 200 of the bearing 20 is not easily deformed due to squeeze, thereby retaining the original center. At the same time, the oil storage space 222 formed by the periphery of the positioning hole 220 of the axle tube 22 corresponding to the bearing 20 will relatively increase the oil storage space 222 formed in the axle tube 22, thereby enhancing the lubricating effect of the rotation shaft 24, and thereby relatively increasing the lifetime of the bearing 20. In addition, the oil storage space 222 is directly integrally formed in the periphery of the positioning hole 220 of the axle tube 22 during fabrication of the shaft tube 22, so that the fabrication is rapid, thereby decreasing the cost of fabrication.

Figure 3:
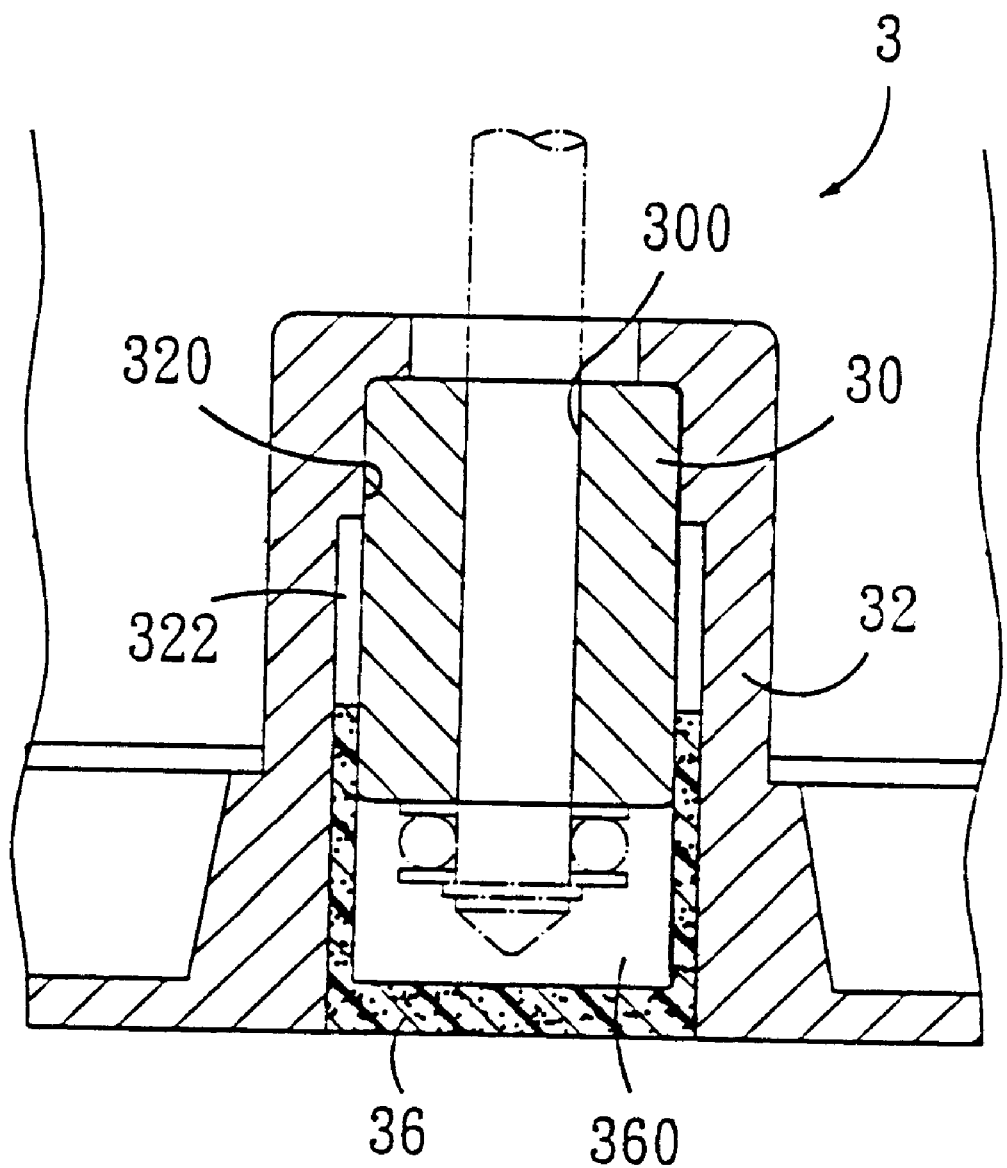
FIG. 3 is an assembled cross-sectional schematic view of a positioning structure of a bearing and an axle tube in accordance with a second embodiment of the present invention.

Referring to FIG. 3, a positioning structure 3 of a bearing and an axle tube in accordance with a second embodiment of the present invention is substantially the same as a positioning structure 2 of a bearing and an axle tube in accordance with the first embodiment of the present invention, and comprises a bearing 30 and an axle tube 32. The difference of the present embodiment is in that the oil seal cover 36 is formed with a retaining groove 360, whereby one end of the bearing 30 is positioned in the positioning hole 320, and the other end is correspondingly positioned in the retaining groove 360, so that the oil storage space 322 is formed in the positioning hole 320 at the top edge of the oil seal cover 36. Thus, during assembly of the bearing 30 of the present embodiment, the bearing 30 is directly placed into the positioning hole 320 from the bottom of the axle tube 32 without having to use the tight fit manner. Then, the oil seal cover 36 is inserted from the bottom of the bearing 30, so that the bottom of the bearing 30 is locked in the retaining groove 360 of the oil seal cover 36, thereby accomplishing the entire assembly. Accordingly, in comparison with the first embodiment, during assembly of the bearing 30 of the present embodiment, the friction area and friction force between the bearing 30 and the inner wall of the positioning hole 320 from the bottom of the axle tube 32 can be reduced more efficiently, thereby ensuring the accuracy of the center of the shaft hole 300 of the bearing 30.

Figure 4:
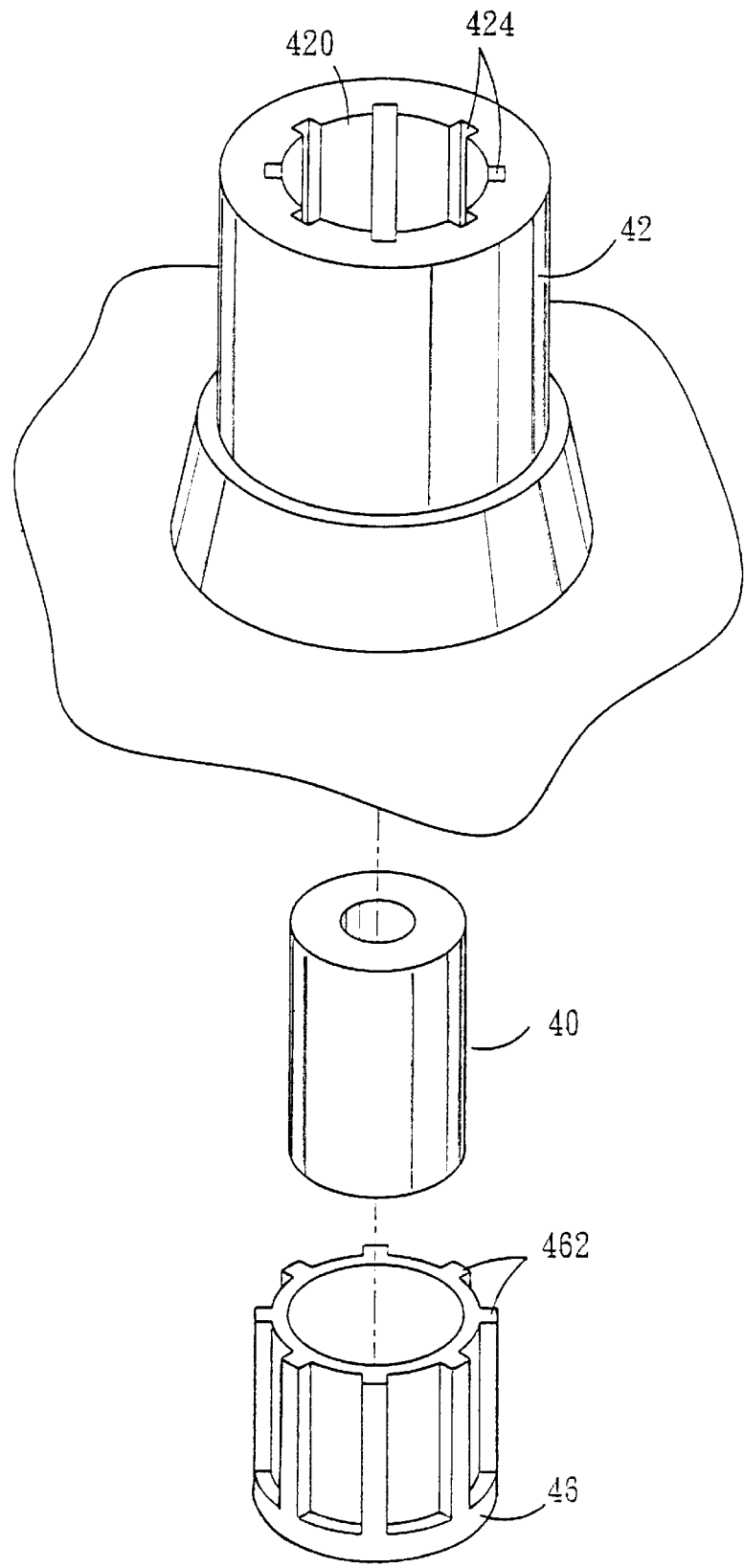
FIG. 4 is an exploded perspective schematic view of a positioning structure of a bearing and an axle tube in accordance with a third embodiment of the present invention.
Figure 5:
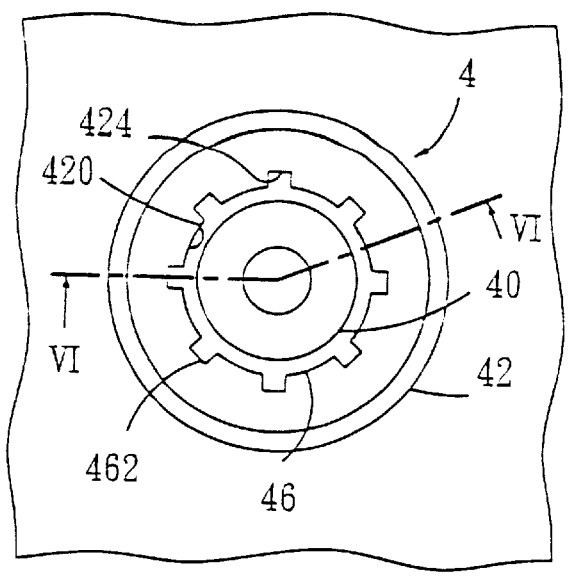
FIG. 5 is a top plan schematic view of a positioning structure of a bearing and an axle tube in accordance with a third embodiment of the present invention.
Figure 6:
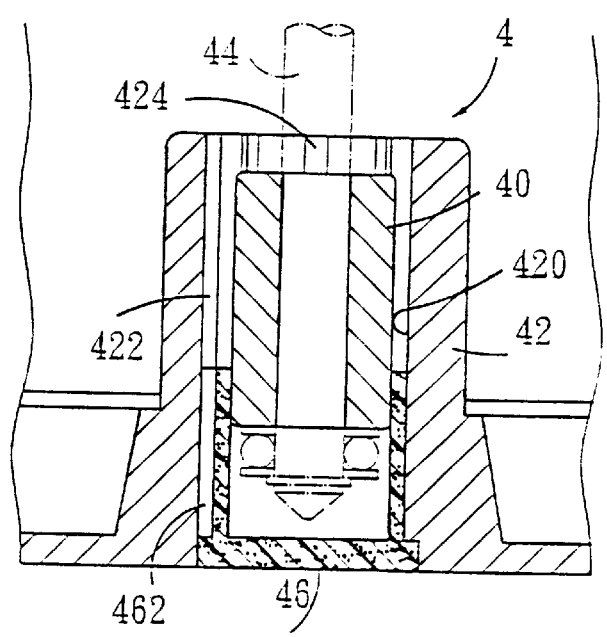
FIG. 6 is a cross-sectional view of the positioning structure of a bearing and an axle tube along line VI—VI as shown in FIG. 5.

Referring to FIGS. 4–6, a positioning structure 4 of a bearing and an axle tube in accordance with a third embodiment of the present invention is substantially the same as the positioning structure in accordance with the first and second embodiments of the present invention, and comprises a bearing 40 and an axle tube 42. The difference of the present embodiment is in that the periphery of the positioning hole 420 of the axle tube 42 is formed with a plurality of spaced locking grooves 424, while the oil seal cover 46 is formed with a plurality of corresponding protruding locking members 462 having a length smaller than that of the locking grooves 424, whereby the locking members 462 of the oil seal cover 46 are inserted into the locking grooves 424 from the bottom of the positioning hole 420 to be positioned in the bottom of the positioning hole 420, so that the oil storage space 422 is formed in the locking grooves 424 at the top edge of the locking member 462, and is arranged in multiple spaced manner. Therefore, in the present embodiment, when the locking members 462 of the oil seal cover 46 are positioned in the bottom of the positioning hole 420 of the axle tube 42, multiple oil storage spaces 422 are formed in the locking grooves 424 of the positioning hole 420, thereby enhancing the lubricating effect of the rotation shaft 44, and thereby relatively increasing the lifetime of the bearing 40.

Accordingly, the present invention has the following advantages:

1. The present invention can prevent the center of the bearing from deflecting efficiently:
   In the present invention, the periphery of the positioning hole 220, 320, 420 of the axle tube 22, 32, 42 corresponding to the bearing 20, 30, 40 is formed with the oil storage space 222, 322, 422, so that when the bearing 20, 30, 40 is received and positioned in the positioning hole 220, 320, 420 of the axle tube 22, 32, 42, the friction area and the friction force between the periphery of the bearing 20, 30, 40 and the inner wall of the positioning hole 220, 320, 420 can be reduced efficiently. Thus, the shaft hole 200, 300 of the bearing 20, 30, 40 is not easily deformed due to squeeze, thereby retaining the original center, so that rotation of the rotation shaft 24, 44 that is inserted into the shaft hole 200, 300 of the bearing 20, 30, 40 is more convenient without producing noise.

2. The present invention can enhance the lubricating effect:
   The oil storage space 222, 322, 422 formed by the periphery of the positioning hole 220, 320, 420 corresponding to the bearing 20, 30, 40 will relatively increase the oil storage space 222, 322, 422 formed in the axle tube 22, 32, 42, so that the lubricating oil released from the bearing 20, 30, 40 has more oil storage space 222, 322, 422 to perform the oil guide and oil storage work, thereby efficiently enhancing the lubricating effect of the rotation shaft 24, 44, and thereby relatively increasing the lifetime of the bearing 20, 30,40.

3. The present invention can save the cost of fabrication:
   The oil storage space 222, 322, 422 is directly integrally formed in the periphery of the positioning hole 220, 320, 420 during fabrication of the shaft tube 22, 32, 42, without having to form the oil storage space 222, 322, 422 in the bearing 20, 30, 40 as is disclosed in the conventional positioning structure, such that no additional work is needed after the bearing 20, 30, 40 has been manufactured. Thus, the fabrication is rapid, thereby decreasing the cost of fabrication.

From the above-mentioned description, the positioning structure of a bearing and an axle tube in accordance with the present invention can prevent the center of the bearing from deflecting efficiently, can enhance the lubricating effect, and can save the cost of fabrication.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A positioning structure of a bearing and an axle tube, wherein, the axle tube has a positioning hole for receiving and positioning at least one bearing which has a shaft hole for passage of a rotation shaft, and the positioning hole has a bottom sealed with an oil seal cover formed with a retaining groove, a first end of the bearing is positioned in the positioning hole while of the bearing is positioned in the retaining groove, the positioning hole has a periphery formed with an oil storage space corresponding to the bearing and the oil seal cover.

2. The positioning structure of a bearing and an axle tube as claimed in claim 1, wherein a periphery of the positioning hole is formed with a plurality of spaced locking grooves, while the oil seal cover is formed with a plurality of corresponding protruding locking members having a length smaller than that of the locking grooves, whereby the locking members of the oil seal cover are inserted into the locking grooves from a bottom of the positioning hole to be positioned in the bottom of the positioning hole, so that the oil storage space is formed in the locking grooves at the top edge of the locking member, thereby forming multiple spaced arranged oil storage spaces.

3. The positioning structure of a bearing and an axle tube as claimed in claim 1, wherein the positioning hole has a side edge formed with an oil filling hole which is sealed by a removable plug.

\* \* \* \* \*